Sept. 19, 1939.    E. J. MORRIS    2,173,338
RADIATOR SCREEN
Filed April 28, 1939
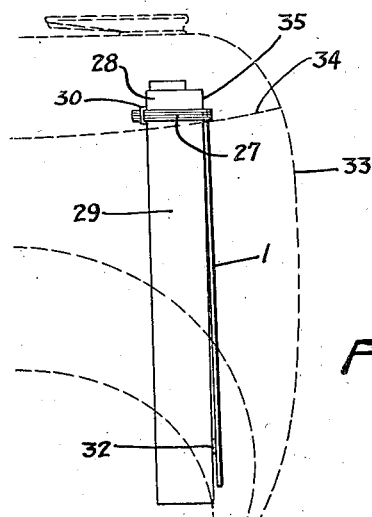
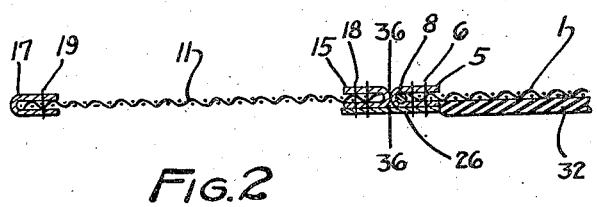
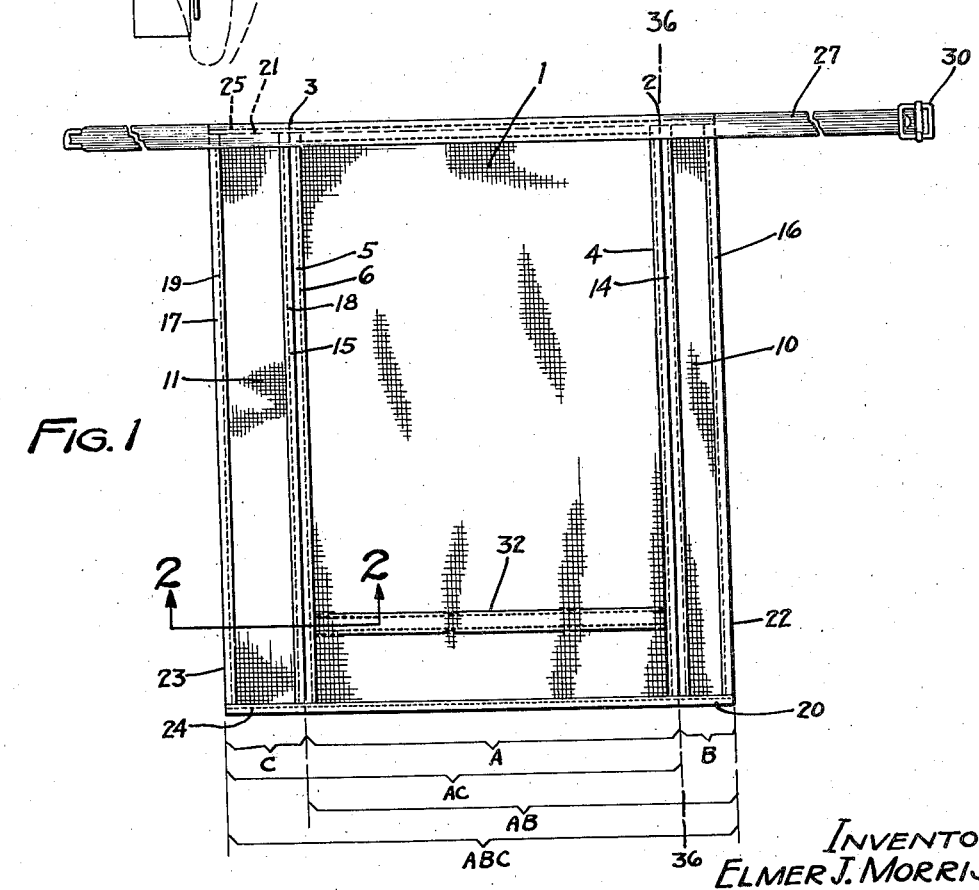
INVENTOR
ELMER J. MORRIS
By Paul, Paul, Moore & Giese
ATTORNEYS Patented Sept. 19, 1939

2,173,338

UNITED STATES PATENT OFFICE 2,173,338

RADIATOR SCREEN

Elmer J. Morris, Minneapolis, Minn., assignor to Durkee-Atwood Company, Minneapolis, Minn., a corporation of Minnesota Application April 28, 1939, Serial No. 270,496

7 Claims. (Cl. 293—54)

The present invention relates to radiator fly screens of the type used to exclude flies and insects from heat dissipating radiators of automotive vehicles. It frequently happens during driving of an automotive vehicle in the summer time that flies, insects, grasshoppers and the like lodge in the intricacies of the heat dissipating radiator of an automotive vehicle and so clog the air passage of the radiators that overheating and serious motor damage results.

At the present time, automotive vehicles are usually equipped with a radiator section which has a flat vertical front surface, which is customarily housed with an ornamental grille of irregular configuration. Heretofore it has been customary to mount the radiator fly screen upon the ornamental grille and since the grille design varies widely in various makes of motor cars, it has been impossible to provide a screen which is adaptable to the radiator grille of more than one automobile and as a consequence, large stocks of screens were necessary for servicing various makes of automobiles.

According to the present invention, the radiator screen is applied to the flat front vertical surface of the radiator and the construction is such that it may be applied to radiators of varying widths and heights, with the result that one type of screen will accommodate most of the widely used makes of automobiles. As a consequence, a small stock of screens will suffice for most service requirements.

It is, therefore, an object of the invention to provide a radiator screen capable of universal application to the flat radiator surface of a variety of radiators having widely varying widths and height. Specifically it is an object of the invention to provide a radiator screen capable of being used upon narrow or wide radiators and radiators of intermediate widths.

It is also an object of the invention to provide a radiator screen which is capable of being installed through the restricted passageway between the radiator surface and the ornamental grille in front of the radiator.

It is a further object of the invention to provide a radiator screen of neat appearance one which can be applied by unskilled labor without the use of more than ordinary and readily available tools.

It is also an object of the invention to provide a radiator screen which is capable of being held in place by single attachment and which will remain in place without rattling or chattering.

Other and further objects of the invention are those inherent in the apparatus herein illustrated and described.

The invention is illustrated with reference to the drawing in which Figure 1 is a front vertical view.

Figure 2 is a partial sectional view along the lines 2—2 of Figure 1.

Figure 3 is a side elevational view of a portion of the front end of an automobile showing the apparatus of the present invention applied to the radiator thereof.

In all of the views, the same characters designate corresponding parts.

Referring to Figure 1, the screen of the present invention will be seen to consist of a plurality of resilient panels of screening material such as wire cloth or other similar screen material. As shown in this Figure 1, the screen consists of a central vertical panel 1 having vertical edges 2 and 3. The edges 2 and 3 are bound by binding strips 4 and 5, which are preferably of artificial leather or similar relatively water proof and inexpensive material. The binding strips are preferably attached to the wire cloth or screening material by means of stitching as shown at 6 in Figure 2. It is preferable that the bindings 4 and 5 enclose a vertical wire 8 of steel or other similar springy material.

At the right side of panel 1 as shown in Figure 1, there is positioned a narrow panel 10, which is composed of the same type of screening material used for the central panel. The right panel 10 is bound along edges 14 and 16 by means of binding material similar to that used at 4 and 5 for the central panel 1, but it will be noted that there is no stiffening wire enclosed in the bindings of the right side panel.

At the left of central panel 1 as shown in Figure 1, there is a similar left side panel 11, which is somewhat wider than the panel 10, but not as wide as the central 1. The panel 11 is likewise composed of screening material similar to that used in panel 1 and is bound as shown at 15 and 17 by stitching a binding of artificial leather or waterproof cloth along the edges thereof. This binding is illustrated in cross-section in Figure 2 wherein it will be seen that the binding is attached to the side panel by means of stitching 18 and 19.

Central panel 1, the right panel 10 and the left panel 11 are assembled with their vertical edges contiguous as shown at Figure 1 and are held in assembled relation by means of a binding 20 along the bottom edge thereof and a similar binding 21 along the top edge thereof. The bindings 20 and 21 extend from the right most edge 22 of panel 10 to the left most edge 23 of panel 11, and are stitched to the three panels by means of stitching 24 and 25.

The three panels are also held together by means of a plurality of strips 26 of flexible easily severable material, which are stitched to the contiguous bound edges of the panels. Thus as shown in Figure 1 the binding 5 of panel 1 and the binding 15 of panel 11 are attached together by an underlying strip 26 of fabric, which may desirably be of the same type as that used for the binding of the screens. The strip 26 between panels 1 and 11, and a similar strip between panel 1 and panel 10 thus serve as hinge joints.

At or near the top of the fly screen assembly there is provided a fastening strap 27 which is of sufficient length to encircle the top tank 28 of radiator 29 as shown in Figure 3. The strap is provided with a buckle as shown at 30 by which it may be fastened tightly around the top tank.

In some instances, it is desirable to provide a weighting member 32 near the lower portion of the central panel 1 so as to assist in holding the same in place when applied to a radiator. The member 32 being of rubber, also serves as a bumper, which spaces the screen away from the radiator core. If desired, the surface of member 32 which comes in contact with the radiator core may be covered with a layer of felt or other soft material so as to furnish a padded surface for contact with the radiator core.

In Figure 3 the fly screen of the present invention is shown as applied to a modern automobile of the type having a front heat-dissipating radiator 29 housed within the ornamental grille illustrated by the dotted lines 33. According to present most commonly used automotive designs the hood of the automobile is raised along an opening line 34 and the top of the radiator of the automobile is thus exposed for servicing. There is ordinarily sufficient room between the front vertical surface 35 of the radiator and the ornamental grille 33 for an attendant to place his arm down between these members for servicing the radiator, and the fly screen of the present invention may accordingly be applied through the opening thus provided, although the opening is somewhat restricted.

It may be noted with reference to Figure 1 that the strap 27 is fastened only to the central panel 1 of the fly screen and is not stitched to the side panel 10 or 11.

The horizontal dimension A of the central panel 1, the dimension B of panel 10 and the dimension C of panel 11 are selected with reference to the widths of the various radiators with which the panel is designed to be used. The fly screen assembly may be used as an entirety as shown in Figure 1, or either one or both of the side panels may be folded back behind the central panel and the width thus reduced where the radiator to which the device is applied is narrower than the maximum dimension ABC of the three panels. Thus if all three panels are used, the total width of the fly screen will be ABC as shown in Figure 1; if only panels A and C are used, the width becomes AC, which is somewhat less than the total width of the assembly. Likewise, if a somewhat lesser width is desired panels A and B will be used in which case the total width is AB. Finally for the narrowest radiators, both panels B and C are folded back or discarded and the over-all width of the unit is reduced to dimension A.

In dispensing with panels 10 and 11, they may either be folded back out of the way as stated above, or they may permanently be severed from the assembly by cutting as for example, by severing the strip 26 along the line 36—36 of Figure 1. In applying the device, the radiator width is determined by measurement and either one or both of the side panels 10 and 11 are either folded back or severed from the unit and the remaining panel or panels used for covering the front of the radiator.

In installing the device, the assemlby may be curved about a vertical axis so as to be inserted into the restricted space between the front vertical surface of the radiator and the ornamental grille 33. Care is taken not to crease the screen material so that it will recoil and assume its initial flat position when applied to the radiator. In this connection, it is noted that the weighting strap 32, if used, is preferably made of rubber or other similar flexible material so that there will be no interference with curving of the screen when applying it to the radiator.

In applying the screen to the radiator the vertical stiffening wires 8 tend to give the rolled screen vertical stability when rolled and it can accordingly easily be inserted through a relatively restricted opening. After the screen is uncoiled and placed against the radiator the stiffening wires and weighted member 32 tend to hold the screen against the flat vertical surface of the radiator, and prevent it from vibrating during operation of the vehicle.

It is apparent that many variations may be made in the details of the present apparatus without departing from the spirit of the invention. As suggestive of such variations I may arrange the principal panel at one side with one, two or more side panels attached together and to the principal panel at one side thereof. The side panels may be of the same or different dimensions, or may be of the same dimension as that of the principal panel. Thus two or more panels of equal dimensions may be joined together to be used one, two or more at a time in accordance with the width of the radiator to be serviced. Hence, I may use one wide panel and attach to it at one side a plurality of side panels of equal width, with the attachment strap sewed to all panels. The entire assembly may be used with all of the side panels attached, or one or more side panels may be severed by slitting the hinge strip and severing the stitching of the attachment strap. Also instead of wire cloth, a screening material of a woven textile to which a stiffening coating is applied, may be used. Similarly the bindings may be of molded rubber rather than a binding strip material sewed on. Likewise, any desirable type of fastening strap, clamps or wires may be substituted for the attached strap 27. Similarly the position of the fastening strap 27 need not be at the exact top of the screen, but may be spaced from the top.

As a further modification, it may be suggested that the vertical dimension of the present fly screen may be varied by the provision of a foldable or severable bottom panel or panels in a manner similar to that shown for the side panels.

Having thus described the present invention, what I claim is:

1. A screen for automobile radiators comprising a central rectangular panel of screen material, side panels of screen material attached along opposite edges of the central panel, each of said side panels being rectangular and narrower than the central panel, said side panels being attached to the central panel by narrow strip of easily severable flexible material.

2. A screen for automobile radiators comprising a central rectangular panel of wire cloth, rectangular side panels of wire cloth having a length equal to the length of the central panel positioned along opposite sides of said central panel and narrow joining strip of easily severable flexible material fastened to the opposite edges of the central panel and to the side panel.

3. A screen for automobile radiators comprising a central rectangular panel of wire cloth, rectangular side panels of wire cloth having a length equal to the length of the central panel positioned along opposite sides of said central panel and narrow joining strips of easily severable flexible material fastened to the opposite edges of the central panel and to the side panels, and a fastening strap of a length greater than the combined width of the central and side panels positioned transversely of the central and side panels near one end thereof, and means attaching the strap to the central panel.

4. A screen for automobile radiators comprising a central rectangular panel of wire cloth, a binding around the edges of said panel, rectangular side panels of wire cloth each having a length equal to the length of the central panel and widths unequal to each other and less than the width of the central panel positioned along opposite sides of said central panel contiguous with the side edges thereof, bindings around the edges of the rectangular side panels and easily severable joining strips of flexible material fastened to the side edges of the central panel and the contiguous edges of the side panels.

5. A screen for automobile radiators comprising a central rectangular panel of wire cloth, a binding around the edges of said panel, rectangular side panels of wire cloth each having a length equal to the length of the central panel and widths unequal to each other, but less than the width of the central panel positioned along opposite sides of said central panel, contiguous with the side edges thereof, bindings around the edges of the rectangular side panels easily severable joining strips of flexible material fastened to the side edges of the central panel and the contiguous edges of the side panels, and stiffening means in the bindings along the side edges of the central panel.

6. A screen for automobile radiators comprising a central rectangular panel of wire cloth, a binding around the edges of said panel, rectangular side panels of wire cloth each having a length equal to the length of the central panel and widths unequal to each other and less than the width of the central panel positioned along opposite sides of said central panel, contiguous with the side edges thereof, bindings around the edges of the rectangular side panels easily severable joining strips of flexible material fastened to the side edges of the central panel and the contiguous edges of the side panels and a fastening strap of a length greater than the combined width of the central and side panels positioned transversely of the central and side panels near one end thereof, and means attaching the strap to the central panel.

7. A screen for automobile radiators comprising a central rectangular panel of wire cloth, a binding around the edges of said panel, rectangular side panels of wire cloth each having a length equal to the length of the central panel and widths unequal to each other, but less than the width of the central panel positioned along opposite sides of said central panel, contiguous with the side edges thereof, bindings around the edges of the rectangular side panels, easily severable joining strips of flexible material fastened to the side edges of the central panel and the contiguous edges of the side panels, and stiffening means in the bindings along the side edges of the central panel, said central panel being weighted near the end opposite the fastening strap.

ELMER J. MORRIS.